United States Patent Office 3,419,615

Patented Dec. 31, 1968

3,419,615

PRODUCTION OF CYCLODODECANOL AND CYCLODODECANONE

Elroy J. Inchalik, Cranford, Isidor Kirschenbaum, Westfield, N.J., and Ralph M. Hill, London, England, assignors to Esso Research and Engineering Company, a corporation of Delaware No Drawing. Continuation-in-part of application Ser. No. 23,632, Apr. 21, 1960. This application Mar. 24, 1965, Ser. No. 442,480

6 Claims. (Cl. 260—586)

This invention is a continuation-in-part of Ser. No. 23,632 filed Apr. 21, 1960, now abandoned.

The present invention relates to an improved process for the critical air oxidation of cyclododecane to a mixture of cyclododecanol and cyclododecanone by which minimum losses of valuable feed to byproducts of little value which cannot be reused in the process are obtained. More particularly, this invention relates to obtaining selectivities to cyclododecanol and cyclododecanone of above 90% by utilizing critical conditions as follows: (1) high purity cyclododecane feed, substantially free (viz. <0.3 wt. percent) of cyclododecanone, (2) oxygen-containing gas containing 7–21 mol. percent oxygen, (3) 2.0–6.5 wt. percent boric acid or boric oxide (based on cyclododecane) used as the sole catalyst, (4) temperatures of 155–170° C., and (5) conversions of 10–25% in a batch process (5–15% in a continuous process.)

The present invention is of considerable importance in view of the recent discovery that butadiene can be trimerized to 1,5,9-cyclododecatriene in the presence of a metallo organo catalyst such as titanium comprising catalyst. A suitable process for preparing cyclododecatriene is described, for example, in Angewandte Chemie, vol. 69, No. 11:397 (June 7, 1957). According to this process both extremely high conversions and selectivities are obtained and the cyclododecatriene product can be cheaply converted by hydrogenation to the desired cyclododecane starting material utilized in this invention. As is well known and as is described in the above-identified article, both the diacid (open chain $\alpha$–$\omega$ $C_{12}$ diacid) and the lactam of these materials are extremely useful in the preparation of nylon type materials. These nylon precursors can, of course, be economically prepared from the alcohol and ketone prepared with the present invention by methods such as (1) oxidation of either material, or both, to the diacid, e.g. by nitric acid oxidation, or (2) Beckmann rearrangement of the oxime of the ketone to form a lactam.

According to the present invention it has now been discovered that the high selectivity, i.e. above 90%, required for economic commercial synthesis of cyclododecanol and cyclododecanone is obtained only within narrowly defined reaction conditions used in combination. Presented below is a summary of the effect of operating outside these narrowly defined ranges (laboratory specific data presented in the examples):

(1)

(a) Temperature below 155° C.—Little or no reaction.
(b) Temperature above 170° C.—Organic acid ester and other byproduct formation markedly increased.

(2)

(a) Oxygen-containing gas containing less than 7 mol. percent oxygen—Little or no reaction (not helped by increasing temperature).
(b) Oxygen concentration above 21%—No substantial advantage would be obtained since oxygen not limiting and oxygen enrichment very expensive.

(3)

(a) Cyclododecane feed containing more than 0.3 wt. percent cyclododecanone—Reduces selectivity below 90%, probably because ketones further oxidized to acid which esterfies with free alcohol both of which are lost as low or no value byproduct.

(4)

(a) Conversion in a batch process above 25% (in a continuous process above 15%)—Reduces selectivity below 90%.
(b) Conversions below 10% batch (below 5% continuous)—Only small improvement above 90% in selectivity, expense of recycle rapidly increasing, (5)

(a) Less than 2.0 wt. percent boric acid—Reduces selectivity rapidly below 90%.
(b) Above 6.5 wt. percent boric acid—Unnecessary additional reactant expense not significantly improving selectivity.

In addition to the critical conditions above recited less critical conditions are:

(A) Pressure—Approximately 1–10 atmospheres absolute, preferably 1–5 atmospheres (liquid phase operations).
(B) Reaction time—0.5–5 hrs. as required for conversions stated above. Generally directly proportional to conversion.
(C) Use of diluents is not preferred but can be used if desired.
(D) Use of catalysts in addition to boric acid or boric oxide is permissible but is not preferred since it reduces overall selectivities to alcohol and ketone and also increases catalyst recovery and recycle costs. Use of catalysts is particularly detrimental because it increases the amount of ketone formed relative to alcohol which increases the difficulty of completely removing it from unconverted feed recycled (required for high selectivity).

With respect to D above it has now been found that catalysts containing manganese or cobalt in the form of their salts or oxides, e.g. cobalt or manganese oxide, preferably cobalt naphthenate, manganese acetate, utilized in amounts of 0.001 to 0.1 mole catalyst/mole of feed shift the selectivity in favor of ketone preparation. Copper, iron, nickel, platinum, silver and palladium salts or compounds may also be utilized.

As alternates to boric acids or boric oxide other less preferred boric acid compounds as follows may be used: boron containing compounds which generate a boric acid upon contact with water, and boric acid derivatives, e.g. in the order of preference (1) $C_1$–$C_{13}$ alkyl borate esters, preferably $C_1$–$C_6$ straight or branched chain alkyl borate esters, e.g. trimethyl borate, triethyl borate, tributyl borate, etc., (2) alkyl boric acids, i.e. $R_2BOH$ (borinic acids) and $RB(OH)_2$ (boronic acids). Wherein R is an alkyl radical, preferably a $C_3$ to $C_8$ alkyl radical; and (3) the esters of the above boronic and borinic acids with $C_1$ to $C_4$ alcohols. For an explanation of the properties of the aforementioned boric acid compounds see "The Chemistry of Organometallic Compounds," Rochow, Hurd and Lewis, 1957 by John Wiley and Sons, New York and London, pages 127–129.

Recycle of unconverted paraffin is desirable in view of the relatively low conversions. This is preferably accomplished by fractionation prior to liberation of the alcohol by hydrolysis. Free ketone may also be separated before hydrolysis. In connection with these separations it should be kept in mind that the amount of ketone in the total feed (fresh plus recycle) must be kept below 0.3 wt. percent to maintain the desired above 90% selectivities.

The oxidized product mixture containing the borate ester of the product alcohol and free ketone is reacted to convert said ester to the corresponding alcohol. This reaction may be carried out with water or with a lower molecular weight alcohol, e.g. $C_1$–$C_6$ alcohol, preferably methanol. If desired, prior to liberation of the alcohol, the free ketone may be removed by methods such as distillation to thus obtain this product separately. It should be noted that the use of lower alcohols, particularly methanol, in an ester interchanger reaction permits recovering the boric acid or derivative thereof from the reaction mixture. Thus, when the ester interchange reaction with methanol is used, trimethylborate may be recovered as an azeotrope, boiling point 54.8° C. (769 mm. Hg) and containing 26.1 wt. percent methanol.

The present invention will be more clearly understood from a consideration of the following examples. In each of these examples, the alcohols and ketones are recovered from the reaction products as follows: The crude reaction mixture is dissolved in diethyl ether and is then washed twice with 6.5 wt. percent sodium bicarbonate to hydrolyze the borate esters. This mixture is then washed an additional two times with 2 wt. percent sodium carbonate to remove acids and an additional three times with water. The mixture is then dried over anhydrous magnesium sulfate and, after filtration, the ether is removed in a rotary evaporator. The combined aqueous washes are then acidified to isolate any additional acids if formed. The amounts of the products obtained are then determined by standard analytical methods.

Example 1.—Boric acid vs. no boric acid

Cyclododecane is reacted at atmospheric pressure with air (21% oxygen) supplied at a rate of about 2.1 ft.$^3$ per gm. mole of cyclododecane per hour in a laboratory stirred batch reactor under the conditions described below.

| | | |
|---|---|---|
| Reaction time, hrs | | 6.75 |
| Boric acid, wt. percent | 0 | 6 |
| Temperature, °C | 160 | 160 |
| Conversion, mole percent | 21 | 21 |
| Selectivity, mole percent: | | |
| Alcohol | 30 | 83 |
| Ketone | 20 | 9 |
| Alcohol+Ketone | 50 | 92 |

This data shows that boric acid greatly improves the selectivity to the desired products.

Example 2.—Effect of reaction temperature above critical range on selectivity

Cyclododecane is reacted as described in Example 1 under the following reaction conditions.

| | | | | |
|---|---|---|---|---|
| Boric acid, wt. percent | 6 | 6 | 6 | 6 |
| Conversion, mole percent | 62.5 | 42 | 21 | |
| Temperature, °C | 160 | 175 | 160 | 175 |
| Selectivity, mole percent: | | | | |
| Alcohol | 67 | 70 | 83 | 70 |
| Ketone | 20 | 14 | 9 | 20 |
| Alcohol+Ketone | 87 | 84 | 92 | 90 |

It can be seen that the optimum oxidation temperature is in the range of about 155 to 170° C. for high selectivity and good conversion to alcohol.

Example 3.—Effect of reaction temperature below critical range on conversion

Cyclododecane is reacted as described in Example 1 under the following reaction conditions.

| | | |
|---|---|---|
| Boric acid, wt. percent | 6 | 6 |
| Temperature, ° C | 153 | 160 |
| Selectivity, mole percent: | | |
| Alcohol | (1) | 83 |
| Ketone | (1) | 9 |
| Alcohol+Ketone | (1) | 92 |

At 153° C. there is almost no oxygen up-take in a five hour reaction period and thus, of course, little or no conversion to the desired products is obtained.

Example 4.—Effect of oxygen concentration below critical range on selectivity

Cyclododecane is reacted as described in Example 1 under the following reaction conditions except that in some of the runs, as indicated, air diluted with nitrogen is utilized as the oxidizing gas.

| | | | |
|---|---|---|---|
| Oxidizing gas, mole percent oxygen | 3.5 | 5 | 21 |
| Boric acid, wt. percent | 6 | 6 | 6 |
| Temperature, ° C | 175 | 165 | 160 |
| Conversion, mole percent | <4.5 | <3 | 27 |

It can thus be seen that for high conversions and high selectivities straight air rather than diluted air must be used. Further, of course, it is noted, that oxidation with air would be much more economic than oxidation with diluted air.

Example 5.—Effect of catalysts upon selectivity

Cyclododecane is reacted as described in Example 1 under the following reaction conditions.

| | 3 hrs. | 5.25 hrs. |
|---|---|---|
| Boric acid, wt. percent | 6 | 6 |
| Cobalt naphthenate, wt. percent Co | 0.01 | 0 |
| Temperature, ° C | 160 | 160 |
| Conversion, mole percent | 29 | 27 |
| Selectivity, mole percent: | | |
| Alcohol | 70 | 81 |
| Ketone | 20 | 10 |
| Alcohol+Ketone | 90 | 91 |

It can thus be seen that by adding a cobalt naphthenate catalyst the selectivity to ketone is incresed and the overall selectivity to alcohol+ketone is decreased.

Example 6

Cyclododecane is reacted as described in Example 1 except that a pressure of 100 p.s.i.g. is utilized, under the following reaction conditions to obtain relatively high selectivities to the desired alcohol and ketone.

| | | | |
|---|---|---|---|
| Boric acid, wt. percent | | 9.8 | 3 |
| Trimethyl borate, wt. percent | 10 | | |
| Temperature, ° C | 160 | 175 | 160 |
| Conversion, mole percent | 30 | 40 | 26 |

Example 7.—Continuous unit—selectivity-conversion

A series of statistically designed experiments were conducted in a stirred reactor from which product was continuously withdrawn. The following results were obtained showing the critical range of conversions viz. 5–15% to obtain above 90% selectivity to dodecanol plus dodecanone.

CONTINUOUS $H_3BO_3$ MODIFIED OXIDATION-SELECTIVITY CONVERSION STUDIES[1]

| Run No. | 1 | 2 | 3 | 4 | 5 | 6 | 7[2] | 8 | 9 |
|---|---|---|---|---|---|---|---|---|---|
| Reaction conditions: | | | | | | | | | |
| Wt. percent $H_3BO_3$ On cyclododecane | 5.0 | 7.0 | 7.0 | 7.0 | 3.0 | 3.0 | 3.0 | 3.0 | 3.0 |
| Residence time, hr | 3 | 3 | 4 | 4 | 1.5 | 1.5 | 1.2 | 1.5 | 1.5 |
| Air flow, l/min | 0.8 | 0.8 | 1.2 | 0.8 | 0.6 | 0.6 | 0.6 | 0.6 | 0.6 |
| Product analysis: | | | | | | | | | |
| Mole percent conversion | 20 | 20 | 23 | 26 | 8.5 | 10.1 | 7.3 | 12.1 | 10.9 |
| Mole percent selectivity to—Cyclododecanol | 72 | 69 | 70 | 62 | 77.5 | 80.0 | 87.9 | 74.8 | 80.2 |
| Cyclododecanone | 10 | 14 | 11 | 13 | 13.0 | 12.5 | 6.3 | 15.2 | 12.8 |
| Acids[3] | | | | | 1.8 | 2.0 | 1.2 | 1.6 | 1.8 |
| Esters[4] | | | | | 3.3 | 3.0 | 2.3 | 3.5 | 3.2 |
| Cyclododecanol and cyclododecanone | 82 | 83 | 81 | 75 | 90.5 | 92.5 | 94.2 | 90.0 | 93.0 |
| Total material balance | | 98.4 | 99.0 | | 97.0 | (95) | 98.3 | 96.0 | 98.1 |

[1] All runs made at 160° C.
[2] Oxidation run with $B_2O_3$ in place of $H_3BO_3$.
[3] Calculated as dodecanedioic.
[4] Calculated as $C_{36}$ diester.

Example 8.—Continuous unit—effect of ketone upon selectivity

The following data was obtained in the stirred reactor from which product was continuously withdrawn operated first under the following standard conditions:

| | |
|---|---|
| Reaction temperature ° C. | 160 |
| Residence times hrs. | 1.5 |
| Boric acid concentration wt. percent on cyclododecane | 3 |

and then under the same conditions except that 0.3 wt. percent of cyclododecanone was contained in the feed.

| | Cyclododecane Conversion, mole percent | Selectivity to O—OH+O=O, mole percent |
|---|---|---|
| Standard run | 9.0 | 91.5±2 |
| Ketone in feed (0.3 wt. percent) | 10.3 | 89.2 |

It is to be understood that this invention is not limited to the specific examples, which have been offered merely as illustrations, and that modifications may be made without departing from the spirit of this invention.

What is claimed is:

1. An improved process for the selective oxidation of cyclododecane to cyclododecanol and cyclododecanone which comprises reacting cyclododecane with an oxygen-containing gas containing approximately 7–21 mol percent oxygen in the presence of 2.0–6.5 wt. percent (based on cyclododecane) of a boric acid material selected from the group consisting of boric acid and boric oxide at temperatures of 155–170° C. for a time to obtain conversion of 5–25%, hydrolyzing and recovering cyclododecanol and cyclododecanone from the reaction products with a selectivity based on cyclododecane converted of at least 90%.

2. The process of claim 1 in which the reaction is carried out in a batch process utilizing conversions of 10–25%.

3. The process of claim 1 in which the reaction is carried out in a continuous process utilizing conversions of 5–15%.

4. The process of claim 1 in which, prior to hydrolysis, unconverted cyclododecane is separated from the reaction products and is recycled.

5. The process of claim 1 in which, prior to hydrolysis, unconverted cyclododecane and cyclododecanone are separated from the reaction products and the cyclododecane is recycled.

6. An improved process for the selective oxidation of cyclododecane to cyclododecanol and cyclododecanone which comprises reacting cyclododecane containing less than 0.3 wt. percent cyclododecanone with an oxygen-containing gas containing approximately 7–21 mol percent oxygen in the presence of 2.0–6.5 wt. percent (based on cyclododecane) of a boric acid material selected from the group consisting of boric acid and boric oxide at temperatures of 155–170° C. for a time to obtain conversion of 5–25%, hydrolyzing and recovering cyclododecanol and cyclododecanone from the reaction products with a selectivity based on cyclododecane converted of at least 90%.

References Cited

UNITED STATES PATENTS

| | | | |
|---|---|---|---|
| 1,931,501 | 10/1933 | Luther et al. | 260—586 |
| 1,947,989 | 2/1934 | Hellthaler et al. | 260—586 |
| 2,969,380 | 1/1961 | Helwitz | 260—413 |
| 3,232,704 | 2/1966 | Helbig et al. | 260—586 |

FOREIGN PATENTS

| | | |
|---|---|---|
| 1,070,846 | 2/1954 | France. |

OTHER REFERENCES

Bashkirov et al., "Chem. Abst.," vol. 57, col. 684 to 685 (1962).

LEON ZITVER, *Primary Examiner.*

M. JACOB, *Assistant Examiner.*

U.S. Cl. X.R.

260—617, 462